United States Patent
Akella et al.

(10) Patent No.: US 7,876,726 B2
(45) Date of Patent: Jan. 25, 2011

(54) ADAPTIVE ALLOCATION OF COMMUNICATIONS LINK CHANNELS TO I- OR Q-SUBCHANNEL

(75) Inventors: Ramakrishna Akella, San Diego, CA (US); Yan Hui, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1602 days.

(21) Appl. No.: 10/405,020

(22) Filed: Apr. 1, 2003

(65) Prior Publication Data
US 2003/0202492 A1 Oct. 30, 2003

Related U.S. Application Data

(60) Provisional application No. 60/376,619, filed on Apr. 29, 2002.

(51) Int. Cl.
*H04Q 7/00* (2006.01)
(52) U.S. Cl. ............... 370/329; 370/335; 370/332; 370/337; 370/342; 370/232; 370/478; 455/450; 455/452.1; 455/509; 375/260; 375/347; 709/206
(58) Field of Classification Search .......... 370/329, 370/335, 337, 332, 231, 232, 478, 343; 375/347; 455/450, 451, 452.1
See application file for complete search history.

(56) References Cited

U.S. PATENT DOCUMENTS

| | | | | |
|---|---|---|---|---|
| 5,666,655 A * | 9/1997 | Ishikawa et al. | ............ | 455/512 |
| 5,673,259 A * | 9/1997 | Quick, Jr. | .................... | 370/342 |
| 5,742,588 A * | 4/1998 | Thornberg et al. | .......... | 370/236 |
| 5,757,772 A * | 5/1998 | Thornberg et al. | .......... | 370/236 |
| 5,778,316 A * | 7/1998 | Persson et al. | ............. | 455/434 |
| 5,862,156 A * | 1/1999 | Huszar et al. | ............... | 714/795 |
| 5,862,192 A * | 1/1999 | Huszar et al. | ............... | 375/347 |
| 6,018,547 A * | 1/2000 | Arkhipkin et al. | ........... | 375/133 |
| 6,064,663 A * | 5/2000 | Honkasalo et al. | .......... | 370/335 |
| 6,097,700 A * | 8/2000 | Thornberg et al. | .......... | 370/233 |
| 6,128,322 A * | 10/2000 | Rasanen et al. | ............. | 370/536 |
| 6,356,555 B1 * | 3/2002 | Rakib et al. | ................. | 370/441 |
| 6,418,161 B1 * | 7/2002 | Shively et al. | .............. | 375/222 |
| 6,493,331 B1 * | 12/2002 | Walton et al. | ............... | 370/341 |
| 6,567,665 B1 * | 5/2003 | Kissee | ........................ | 455/436 |
| 6,608,838 B2 * | 8/2003 | Ozluturk | ..................... | 370/441 |
| 6,628,945 B1 * | 9/2003 | Koorapaty et al. | .......... | 455/434 |
| 6,690,944 B1 * | 2/2004 | Lee et al. | .................... | 455/522 |
| 6,724,740 B1 * | 4/2004 | Choi et al. | ................... | 370/335 |
| 6,781,969 B2 * | 8/2004 | Nikides et al. | .............. | 370/318 |
| 6,798,759 B2 * | 9/2004 | Ozluturk | ..................... | 370/335 |
| 6,810,029 B2 * | 10/2004 | Ozluturk | ..................... | 370/329 |
| 6,870,888 B1 * | 3/2005 | Shapiro et al. | .............. | 375/260 |
| 6,920,113 B1 * | 7/2005 | Kovvali et al. | .............. | 370/255 |

(Continued)

*Primary Examiner*—Marceau Milord
(74) *Attorney, Agent, or Firm*—Wade J. Brady, III; Frederick J. Telecky, Jr.

(57) ABSTRACT

System and method for adaptively allocating channels to subchannels and maintain balance on the subchannels. A preferred embodiment comprises an assignment unit (for example, assignment algorithm unit 717) that receives call/connection requests from a call/connection processing unit (for example, call/connection processing unit 712). The assignment unit may use a lookup table or channel metrics to determine an allocation for the call/connection to maintain a balance across the subchannels. The assignment unit may allocate only the call/connection in the request or it may allocate the call/connection in the request plus the calls/connections that are already allocated to achieve balance.

39 Claims, 8 Drawing Sheets

U.S. PATENT DOCUMENTS

| | | | | |
|---|---|---|---|---|
| 6,930,991 B2* | 8/2005 | Ozluturk | ..................... | 370/335 |
| 7,042,856 B2* | 5/2006 | Walton et al. | ............... | 370/329 |
| 7,058,125 B2* | 6/2006 | Cherubini | ................... | 375/225 |
| 7,133,353 B2* | 11/2006 | Sourour et al. | .............. | 370/208 |
| 7,133,460 B2* | 11/2006 | Bae et al. | ..................... | 375/295 |
| 7,133,676 B2* | 11/2006 | Iguchi et al. | ................ | 455/442 |
| 7,173,936 B1* | 2/2007 | Semaan | ................. | 370/395.51 |
| 7,193,966 B2* | 3/2007 | Gupta et al. | ................ | 370/231 |
| 7,349,425 B2* | 3/2008 | Leung et al. | ................ | 370/465 |

* cited by examiner

| CASE | RCQICH (KBPS) | RFCH (KBPS) | RSCH (KBPS) | RACKCH (KBPS) | PAR 99.9% EVDV | PAR 99.9% RACKCH ON I | PAR 99.9% RCQICH ON I |
|---|---|---|---|---|---|---|---|
| 1 | 3.2 | 1.5 | 19.2 (1) | OFF | 6.38 | NA | 5.31 |
| 2 | 3.2 | 1.5 | 19.2 (2) | OFF | 4.88 | NA | 5.62 |
| 3 | 3.2 | 9.6 | 19.2 (1) | OFF | 6.68 | NA | 5.57 |
| 4 | 3.2 | 9.6 | 19.2 (2) | OFF | 5.16 | NA | 5.34 |
| 5 | 0.8 | 1.5 | OFF | 0.2 | 5.85 | 5.35 | 5.76 |
| 6 | 0.8 | 1.5 | OFF | 0.8 | 5.85 | 5.35 | 5.72 |
| 7 | 0.8 | 1.5 | OFF | 0.8 | 6.42 | 5.66 | 5.84 |
| 8 | 0.8 | 9.6 | OFF | 0.8 | 6.56 | 5.80 | 5.71 |
| 9 | 0.8 | 9.6 | 19.2 (1) | 0.8 | 6.77 | 6.69 | 5.95 |
| 10 | 0.8 | 9.6 | 19.2 (2) | 0.8 | 5.51 | - | 5.44 |

ADAPTIVE ALLOCATION OF COMMUNICATIONS LINK CHANNELS TO I- OR Q-SUBCHANNEL

This application claims the benefit of U.S. Provisional Application No. 60/376,619, filed on Apr. 29, 2002, entitled: "Adaptive Allocation of Reverse Link Channels to I- or Q-subchannel," which application is hereby incorporated herein by reference.

TECHNICAL FIELD

The present invention relates generally to a system and method for digital communications systems, and more particularly to a system and method for adaptively allocating communications channels onto subchannels in a digital wireless communications system to maintain balance across the subchannels.

BACKGROUND

Many modern digital wireless communications systems make use of a data encoding technique known as direct sequence spread spectrum (DSSS) to spread data that is to be transmitted across a larger than necessary amount of spectral bandwidth to help improve the communication system's performance in terms of interference and noise. One particular type of DSSS communications system makes use of orthogonal codes to make communications channels orthogonal to one another. By making the communications channels orthogonal to each other, the communications channels do not interact and interference is reduced. Communications systems making use of orthogonal codes are commonly referred to as code division multiple access (CDMA) communications systems.

Later day CDMA communications systems (3G (Third Generation) systems, such as CDMA2000 and UMTS) permit the existence of high-speed reverse link channels (channels from a mobile station to a base station, for example). The high-speed reverse link channels permit the creating of high-speed data links between the mobile station and the base station for use in applications such as Internet access, voice, data, and multimedia applications, and so forth.

However, in the 3G CDMA systems, the reverse links are transmitted using Binary Phase Shift Keying (BPSK) over an In-phase (I) and Quadrature-phase (Q) subchannels and if usage of the subchannels are not balanced, an inordinate amount of transmit power may be applied to one or the other of the two subchannels. A problem that may arise out of an imbalanced system is that a peak-to-average ratio (PAR) of the link may become large. In order to support a large PAR, power amplifiers with sufficient dynamic range must be used. Unfortunately, these power amplifiers tend to be more expensive than power amplifiers with lower dynamic range and they tend to consume more power. Therefore, the overall cost and power consumption of the wireless equipment increases. Unbalanced use of one subchannel over another may lead to other resource constraints, such as lack of available Walsh codes.

A commonly used technique to attempt to evenly distribute the use of the I and Q subchannels is to assign (also interchangeable with the term allocate) certain channels to certain subchannels. For example, in CDMA2000, channels R-DCCH (reverse dedicated control channel), R-PICH (reverse pilot channel), and R-SCH(2) (second reverse supplemental channel) are assigned to the I subchannel while R-FCH (reverse fundamental channel) and several other logical channels are assigned to the Q subchannel.

One disadvantage of the prior art is that the fixed assignment of the channels to certain subchannels does not consider operating conditions, i.e., when the channels are in operation that may skew the subchannel balance. Therefore, the fixed assignment may make an unbalanced situation even worse by forcing a channel onto an already heavily used subchannel.

A second disadvantage of the prior art is that that the subchannels are summed and then spread. A large number of logical channels that need to be summed can negatively impact the dynamic range of the subchannels. This can arise from the fact that analog-to-digital converters with a fixed degree of resolution may be used to convert the signal to be transmitted into a digital format prior to transmission. When a large number of logical channels are summed, the result of the summation may be large. Therefore, the summation may need to be scaled prior to the digital conversion (to ensure that the summation fits within the resolution range of the analog-to-digital converter), and it is the scaling that can result in loss of dynamic range.

SUMMARY OF THE INVENTION

These and other problems are generally solved or circumvented, and technical advantages are generally achieved, by preferred embodiments of the present invention which presents a method and apparatus that permits adaptive allocation of channels onto subchannels to balance the use of the subchannels.

In accordance with a preferred embodiment of the present invention, a method for channel allocation on a link comprising receiving a request for a channel, selecting a channel allocation for the channel, sending information about the channel allocation of the channel, and initiating the channel.

In accordance with another preferred embodiment of the present invention, a channel control unit comprising a call/connection unit containing circuitry to process call/connection requests and to maintain active calls/connections, and a channel controller coupled to the call/connection unit, the channel controller containing circuitry to allocate calls/connections based on call/connection requests provided by the call/connection unit and assign spread codes.

In accordance with another preferred embodiment of the present invention, a wireless communications device comprising an applications unit containing circuitry to support the execution of application programs, a channel control unit coupled to the applications unit, the channel control unit containing circuitry to process call/connection requests, maintain active calls/connections, and allocate calls/connections, and an encoding unit coupled to the channel control unit, the encoding unit containing circuitry to spread, gain control, sum, and filter user data to be transmitted on allocated calls/connections.

An advantage of a preferred embodiment of the present invention is that through active monitoring of the use of subchannels, the use of subchannels can be brought into balance and kept balanced.

A further advantage of a preferred embodiment of the present invention is that the even distribution of the channels in the subchannels may minimize the dynamic range requirements of the subchannels, which results in a lower peak to average ratio.

Yet another advantage of a preferred embodiment of the present invention is that the adaptive allocation may be performed at either a base station or a mobile station, permitting greater flexibility in the implementation of the present invention.

An additional advantage of a preferred embodiment of the present invention is that the adaptive allocation is compatible with existing hardware that does not support adaptive allocation therefore existing hardware does not need to be changed or discarded. This can greatly reduce the implementation costs of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a third generation digital wireless communications system that is compliant to the CDMA2000 and the UMTS (Universal Mobile Telecommunications System) technical standards. An overview of the CDMA2000 technical standard is provided in a document entitled "Introduction to CDMA2000 Spread Spectrum Systems, Release 0," which is herein incorporated by reference. The pertinent section of the CDMA2000 technical standard is specified in a document entitled "Physical Layer Standard for CDMA2000 Spread Spectrum Systems, Release C," which is also herein incorporated by reference. An overview of the UMTS technical standard is provided in a document entitled "$3^{rd}$ Generation Partnership Project; Technical Specifications Group Services and System Aspects General UMTS Architecture (Release 4)," which is herein incorporated by reference. The invention may also be applied, however, to other digital wireless communications systems that use multiple subchannels that permit assignment of channels (in one or both directions) onto one or more (but not all) of the subchannels.

Figure 1:
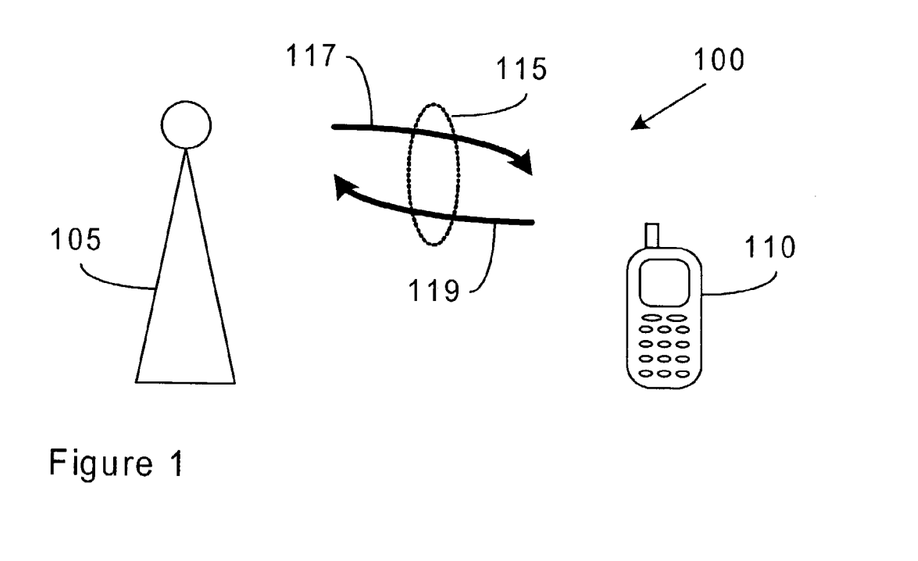
FIG. 1 is a diagram of a portion of a wireless communications system.

With reference now to FIG. 1, there is shown a diagram illustrating a portion of a wireless communications system 100. The portion of the wireless communications system 100 includes a base station (BS) 105 and a mobile station (MS) 110. In a complete wireless communications system, one would expect a larger number of base stations and mobile stations connected wirelessly to the base stations. The mobile station 110 may be as simple as a basic cellular telephone which may serve solely as a voice communications device. Alternatively, the mobile station 110 may be a two-way pager, an enhanced cellular telephone that supports both voice and data applications, a computer (or a personal digital assistant (PDA)) that can use the wireless communications system as a wireless computer network, and so forth.

A wireless connection 115 connects the mobile station 110 to the base station 105. Since the communications between the mobile station 110 and the base station 105 normally requires that data be exchanged between both stations, the wireless connection 115 is typically a two way connection. The wireless connection 115 is made up of a link that carries information from the base station 105 to the mobile station 110 that is commonly referred to as a forward (or down link) link 117 and a link that carries information from the mobile station 110 to the base station (reverse (or uplink) link 119). Note that while the forward 117 and reverse 119 links are displayed as single links, it is possible that each of the forward 117 and reverse 119 links be made up of several channels, including control and data channels. Channels are commonly used to denote individual connections that are used to convey information from a source to a destination.

According to the CDMA2000 and UMTS technical standards, data transmitted on the forward links is transmitted using Quadrature-Phase Shift Keying (QPSK) which involves the data on a single channel being spread across both the In-phase (I) and the Quadrature-phase (Q) subchannels. By transmitting data on both channels, the two subchannels remain balanced (on average), therefore issues such as peak-to-average ratio (PAR) does not become a significant problem.

On the other hand, the reverse channels in the CDMA2000 and UMTS compliant wireless communications networks are transmitted using Binary Phase Shift Keying (BPSK) which transmits the data on a single channel either on the I or the Q subchannels and not both. Since each reverse channel is not spread across both subchannels, it is possible for one of the subchannels to carry more data/information than the other, making the subchannels imbalanced. Imbalanced subchannels may lead to problems such as a high PAR, lack of available spreading code (referred to as Walsh codes in the CDMA2000 and UMTS technical standards), and so forth.

Note that the following discussion may focus upon CDMA2000 and UMTS compliant wireless communications networks and the allocation of channels onto I and Q subchannels of a reverse communications link. However, it should be noted that the present invention is not limited to the allocation of channels in a reverse link. Channels in a forward link may also be allocated onto the forward link's I and Q subchannels to help balance usage.

Figure 2:
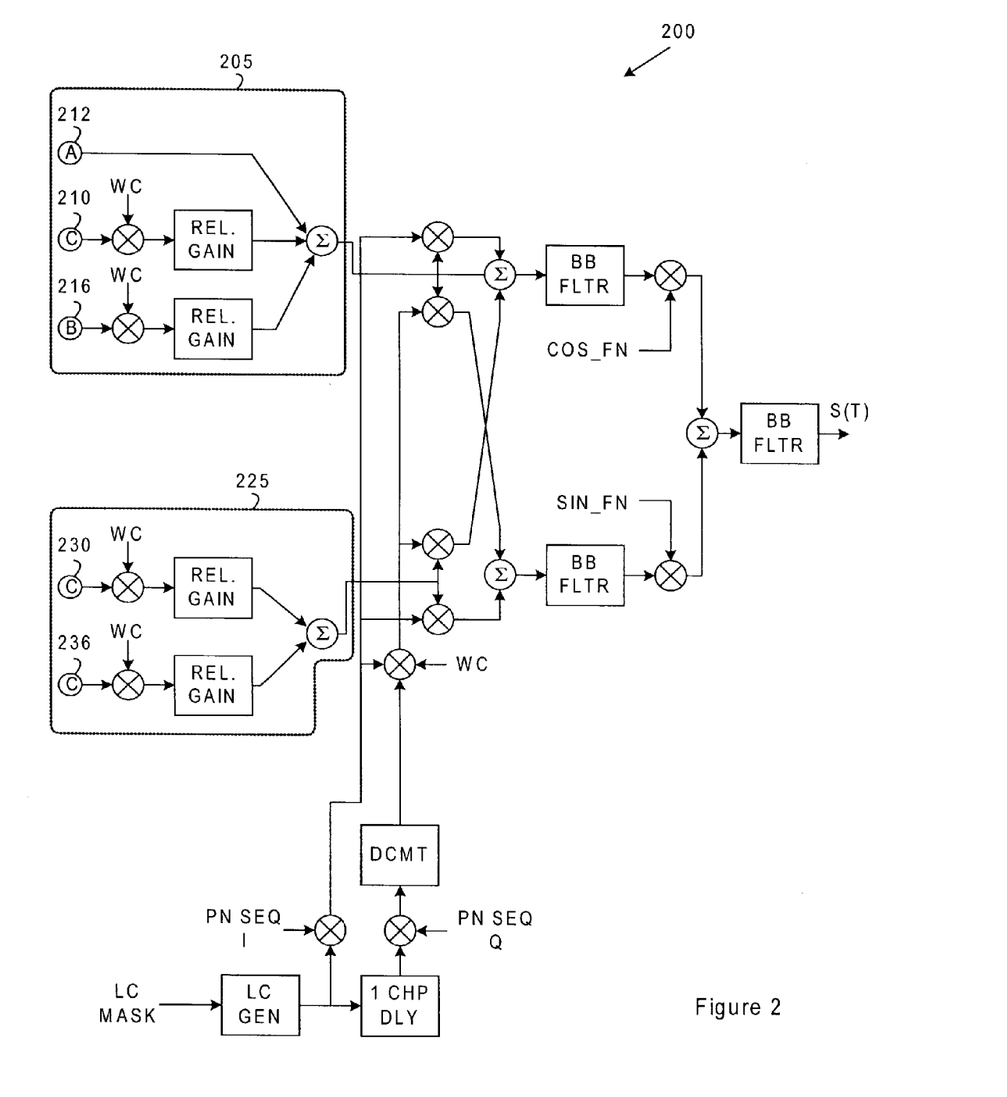
FIG. 2 is a diagram displaying a channel map for a reverse link of a CDMA2000 compliant wireless communications system.

With reference now to FIG. 2, there is shown a diagram illustrating a channel mapping 200 for a reverse link in a CDMA2000 compliant wireless communications network. The channel mapping 200 displays a plurality of reverse channels that make up a reverse link in a CDMA2000 compliant wireless communications network and which channels are mapped to with subchannel (I or Q). As displayed in FIG. 2, four channels are mapped to the I subchannel (collectively displayed in highlight 205) and four channels are mapped to the Q subchannel (collectively displayed in highlight 225). The channel mapping is as follows: I subchannel—Reverse Pilot Channel (A) 212, Reverse Dedicated Control Channel (B) 216, and Reverse Supplemental channel 2 (C) 210 and Q subchannel—Reverse Fundamental Channel (C) 230 and Reverse Supplemental Channel 1 (or Reverse Common Control Channel or Enhanced Access Channel) (C) 236.

Note that the channel mapping is static in nature and that it cannot change, regardless of channel (and subchannel) conditions. For example, it is entirely possible for a mobile station to have the following channels active and mapped as follows: Reverse Fundamental Channel, Reverse Acknowledgment Channel, and Reverse Channel Quality Indicator Channel all mapped onto the Q subchannel and Reverse Pilot Channel onto the I subchannel. Three of the four channels are mapped onto the Q subchannel while only one channel is mapped onto the I subchannel. This may be an exceedingly unbalanced situation that may lead to a large PAR value and/or the use of the majority of available spreading (Walsh) codes in the mobile station.

As stated above, static channel mappings may leave a lot to be desired in terms of performance and channel utilization. A more dynamic channel mapping scheme that can take stock of the channels that are already being used and/or the amount of data/information that is being carried on each of the subchannels will likely perform better in a majority of the situations. The more dynamic channel mapping scheme should be able to take into consideration the existing usage of the subchannels, available bandwidth, bandwidth requirements of the new channel(s), and so forth when it performs the allocation for the new channel. Additionally, it may be necessary for the more dynamic channel mapping scheme to move certain pre-allocated channels around to achieve better balance.

Requests for the allocation of a new channel may be the result of an initiation of a new connection (voice call or data connection) or a satisfaction of a need for additional bandwidth (new channel added to an existing connection). For example, a mobile station has an existing connection with a base station and the user of the mobile station wishes to transmit an email. The act of transmitting the email may cause a request for the allocation of a new channel to service the increase in bandwidth demand. Alternatively, a user of a mobile station may initiate a data connection to an Internet website on the previously inactive mobile station. The initiation of the data connection will result in the establishment of a new connection to a base station.

Figure 3A:
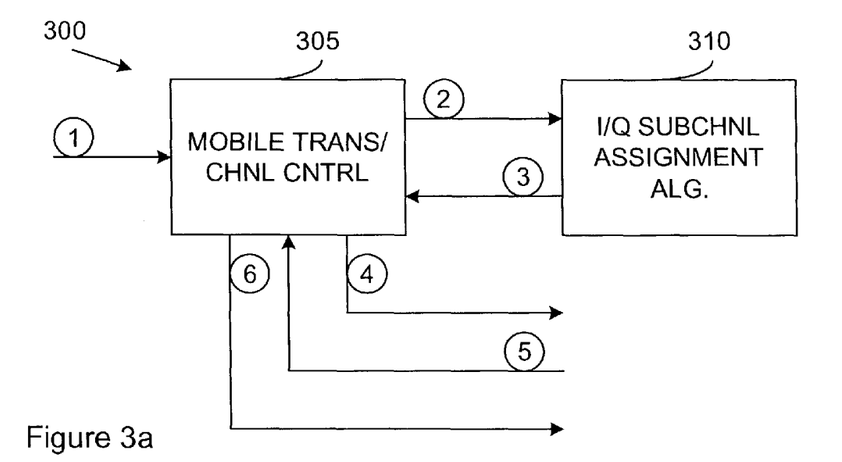
FIGS. 3a and 3b are diagrams displaying sequences of steps in a channel mapping scheme for the dynamic mapping of channel requests, wherein a mobile station (FIG. 3a) and a base station (FIG. 3b) controls the channel mapping, according to a preferred embodiment of the present invention.

With reference now to FIG. 3a, there is shown a diagram illustrating a sequence of steps in a channel mapping scheme 300 for the dynamic mapping of channel requests, wherein the channel mapping is controlled by a mobile station, according to a preferred embodiment of the present invention. The channel mapping scheme may be performed at either the mobile station or the base station. If the channel mapping scheme is implemented at the mobile station, then the integration of enhanced mobile stations (mobile stations with the channel mapping scheme) into the communications network may be relatively easy since un-enhanced mobile stations (mobile stations which do not have the channel mapping scheme) may also be used in the same communications network. If the channel mapping scheme is implemented at the base station, the result is a simpler mobile station since the mobile station does not need to deal with the control issues brought about by the channel mapping scheme.

The channel mapping scheme 300 may be broken down into a series of steps. A first step (1) occurs when a new call request or a request for a new channel arrives at a mobile station transmitter/channel controller 305. Note that the mobile station transmitter/channel controller 305 may or may not be an explicit entity within the mobile station. As discussed earlier, the request may have arisen from a user of the mobile station wishing to establish a voice call to some recipient, the user wishing to transmit data, an application executing on the mobile station wishing to transmit or receive data, or from a base station, and so forth.

The request is decoded and provided to an algorithm 310 for assigning I/Q subchannels (step (2)). The algorithm 310 decides which subchannel to place the requested channel. According to a preferred embodiment of the present invention, the algorithm 310 may decide on where to place the requested channel by using a lookup table that lists the proper placement of a newly requested channel depending on which channels have already been allocated. Alternatively, the algorithm 310 may make use of some measurements of subchannel quality and utilization in its decision process. For example, the algorithm 310 may measure the data traffic on the I and Q subchannels and allocate the requested channel on the subchannel with less data traffic.

Once the channel is allocated, information regarding the channel allocation is provided back to the mobile station transmitter/channel controller 305 (step (3)). The information provided may include the subchannel (I or Q) and the Walsh code to be used. The mobile station transmitter/channel controller 305 may then initiate a new call or a new channel by transmitting a control message (step (4)) to the base station. In the CDMA2000 technical standard, the control message used is referred to as a Layer 3 message and it may indicate which subchannel the new call or new channel is going to use. The base station acknowledges the control message transmitted by the mobile station with a control message (again, in CDMA2000, it is another Layer 3 message) of its own (step (5)). With the reception of the control message from the base station, the mobile station can commence use of the new call or new channel (step (6)).

Figure 3B:
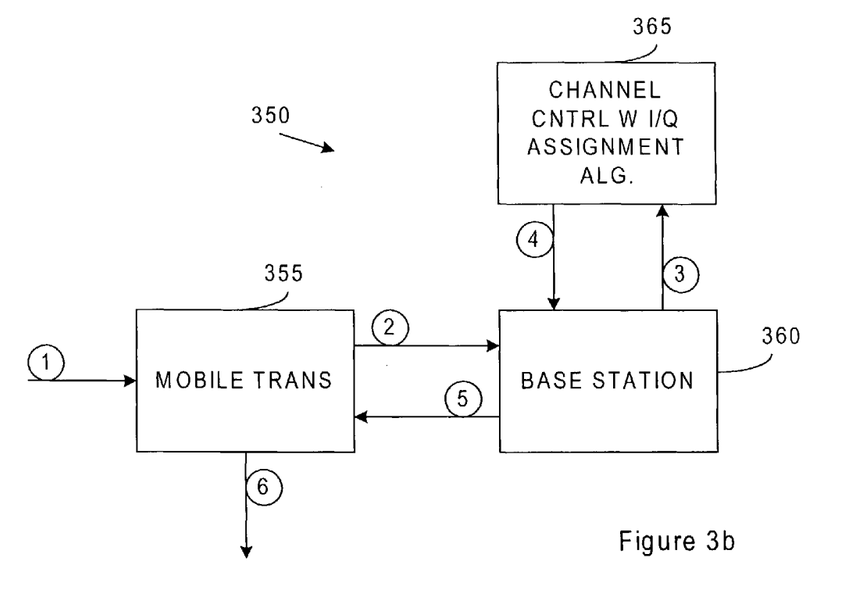

With reference now to FIG. 3b, there is shown a diagram illustrating a sequence of steps in a channel mapping scheme 350 for the dynamic mapping of channel requests, wherein the channel mapping is controlled by a base station, according to a preferred embodiment of the present invention. The channel mapping scheme 350 begins with the arrival of a request for a new call or a new channel at a mobile station transmitter 355 (step (1)). The mobile station transmitter 355 may be similar to the mobile station transmitter/channel controller 305 (FIG. 3a) with the exception that it may not contain a channel controller. The channel controller may no longer be needed due to the fact that the base station is now performing the allocation of calls and channels and not the mobiles station.

The mobile station transmitter 355 will then transmit the request for a new call or new channel to a base station 360 (step (2)). According to a preferred embodiment of the present invention, the mobile station transmitter 355 may convey information related to the request to the base station 360. The information may include channel type, service type, and so forth. Upon receipt of the request from the mobile station transmitter 355, the base station 360 sends the request to a channel controller 365 with a built-in I/Q subchannel assignment algorithm (step 3)). The channel controller 365 may be able to reassign existing channels and make assignments for the new request to the I and/or Q subchannels.

According to a preferred embodiment of the present invention, the channel controller 365 has the capability of not only making assignments of the new call/channel requests, but it may be able to reassign existing channel assignments to help improve the utilization of the I and Q subchannels. The channel controller 365 may make use of a lookup table to perform its channel allocation and reorganization. Alternatively, the channel controller 365 may take inventory of available Walsh codes or make measurements of the subchannels and base its channel allocation on the inventory or measurements. Once the channel controller 365 completes the assignment, it reports the results to the base station 360 (step (4)) and the base station 360 provides the assignment information to the mobile station transmitter 355 in the form of a resource management message (step (5)). After receiving the resource management message from the base station 360, the mobile station transmitter 355 may begin using the call/channel.

Figure 4:
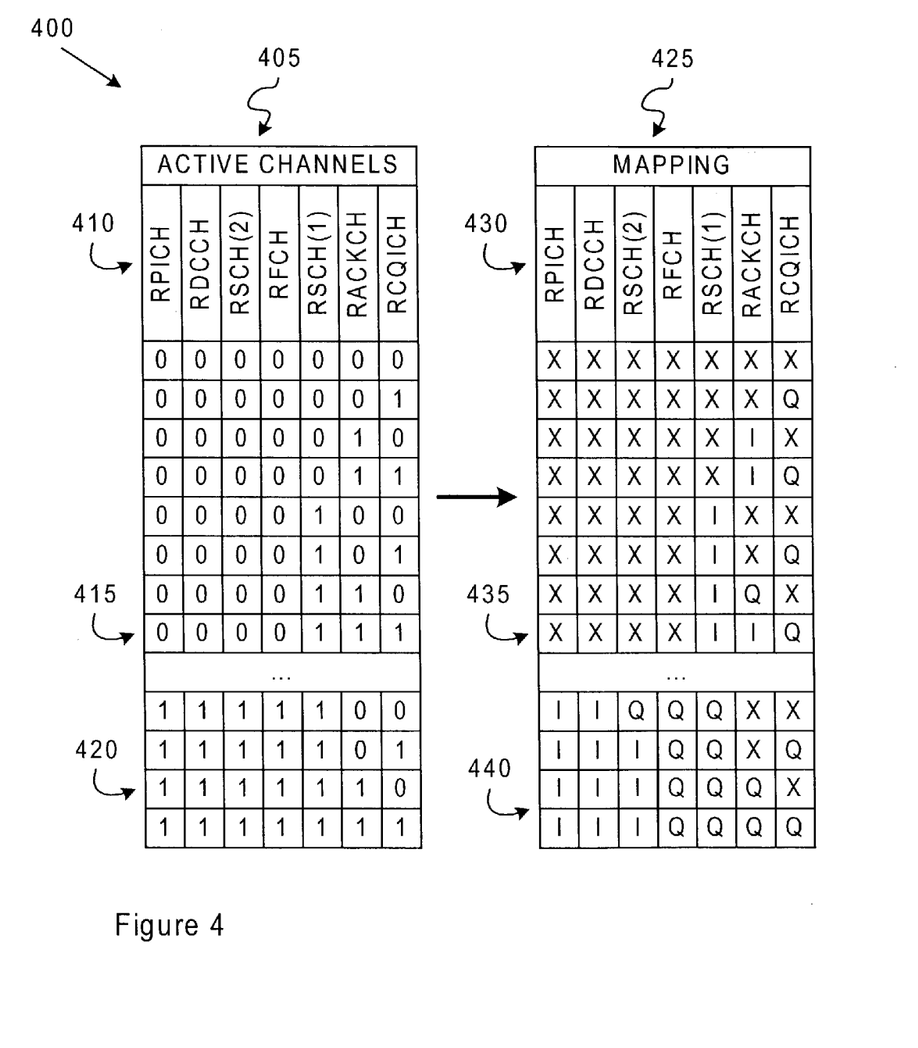
FIG. 4 is a diagram of an exemplary lookup table that may be used to determine channel allocations, according to a preferred embodiment of the present invention.

With reference now to FIG. 4, there is shown a diagram illustrating an exemplary lookup table 400 that can be used to perform call or channel allocation and reorganization, according to a preferred embodiment of the present invention. Note that the lookup table 400 illustrates a possible channel allocation for a CDMA2000 compliant wireless communications network and that other channel allocations are possible. Additionally, a different lookup table may be created for other wireless communications networks.

As displayed in FIG. 4, the lookup table 400 is made up of two portions, an index portion 405 and a mapping portion 425. According to a preferred embodiment of the present invention, the index portion 405 may be a table of active channels that may be mapped onto either the I or Q subchannels. Each active channel that may be mapped can be listed in the index portion 405. For example, the index portion 405 lists seven channels that may be mapped (shown as highlight 410). The seven channels in the index portion 405 include: Reverse Pilot Channel (RPICH), Reverse Dedicated Control Channel (RDCCH), Second Reverse Supplemental Control Channel (2) (RSCH(2)), Reverse Fundamental channel (RFCH), First Reverse Supplemental Control Channel (1) (RSCH(1)), Reverse Acknowledgment Channel (RACKCH), and a Reverse Channel Quality Indicator Channel (RCQICH).

For each channel in the index portion, a value can represent the presence (having been allocated or to be allocated) of the channel. For example, a single bit set to a "one" value may represent that a corresponding channel is present and set to a "zero" value may represent that the corresponding channel is absent. For example, highlight 415 displays a sequence of bits with a value of "0 0 0 0 1 1 1." When referenced back to the list of channels, this means that channels RSCH(1), RACKCH, and RCQICH have either been allocated or requested to be allocated.

The lookup table may be used as follows: upon receiving a request for a new call or new channel, a channel controller (either at a mobile station or a base station) can determine a list of channels that are allocated and are requested to be allocated. The channel controller can then parse the index portion 405 of then lookup table 400 to find an appropriate index. With the appropriate index, the channel controller can then look at the mapping portion 425 of the lookup table 400 to determine where to assign which channels. For example, highlight 435 corresponds to the set of active channels specified by highlight 415. Highlight 435 states that channels RSCH(1) and RACKCH should be allocated to the I subchannel and channel RCQICH should be allocated to the Q subchannel. Channel allocations marked with an "X" are to denote that these channels are not allocated. Note that the allocations displayed in the lookup table 400 are simply for illustrative purposes and may not be indicative of actual allocations.

According to a preferred embodiment of the present invention, the lookup table 400 may be created via experimentation and observations of channel and subchannel usage made by a designer of the mobile and base stations. The designer may perform experiments to test for essentially every possible (or allowable) combination of active channels and from the experiments, the designer may compute the best performing channel allocations and place them in the lookup table. Note that it is possible that the lookup table contain only a subset of the available active channels, since it may be a trade-off between implementation complexity and size versus performance. For example, it is possible that the lookup table contain only an index for a single active channel (or a small subset of available active channels), such as the RFCH and the presence (or absence) of the RFCH may be used to place a different channel either on the I or Q subchannel.

Note that it is possible to have a lookup table, such as the lookup table 400, located at both the mobile station and the base station. In this case, then both the mobile station and the base station may be able to determine the subchannel onto which the requested channel will be allocated. This may be done by simply referencing the channels already allocated plus the channel that wishes to be allocated in a fashion similar to that described above. Since both the mobile station and the base station knows the allocation of the requested channel, a message from the mobile station to the base station plus the base station's acknowledgment can be eliminated in a mobile station controlled allocation or a message from the base station to the mobile station can be eliminated in the case of a base station controlled allocation. Should this be the case, then steps 4 and 5 may be eliminated from FIG. 3*a* and step 5 may be eliminated from FIG. 3*b*, for example. This can reduce the amount of network traffic by eliminating the use of the layer 3 messages that are being used to transmit subchannel allocations.

Figure 5:
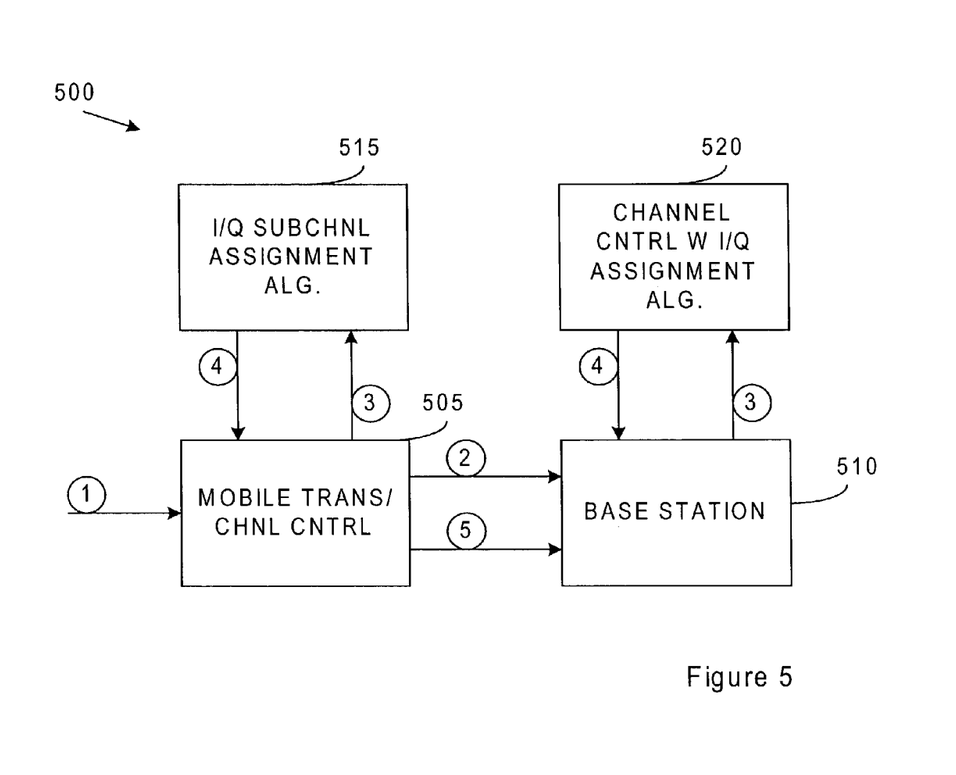
FIG. 5 is a diagram of an algorithm that makes use of channel metrics to determine channel allocations, according to a preferred embodiment of the present invention.

With reference now to FIG. 5, there is shown a diagram illustrating a sequence of steps in a channel mapping scheme 500 for the dynamic mapping of channel requests, wherein the channel mapping is performed in both a mobile station and a base station, according to a preferred embodiment of the present invention. According to a preferred embodiment of the present invention, the channel mapping may be implemented at both the mobile station and the base station. The channel mapping may be performed via the use of a lookup table, such as the lookup table 400 (FIG. 4) or some other deterministic algorithm wherein the same channel assignment may be determined at both the mobile station and the base station when the same set of allocation channels is provided to the algorithm.

The channel mapping scheme 500 may be broken down into a series of steps. A first step (1) occurs when a new call request or a request for a new channel arrives at a mobile station transmitter/channel controller 505. Note that the mobile station transmitter/channel controller 505 may or may not be an explicit entity within the mobile station. As discussed earlier, the request may have arisen from a user of the mobile station wishing to establish a voice call to some recipient, the user wishing to transmit data, an application executing on the mobile station wishing to transmit or receive data, or from a base station, and so forth.

The request is also provided to a base station 510 (step (2)). This may be due to the fact that both the mobile station transmitter/channel controller 505 and the base station 510 needs to know the request in order to properly allocate the channel. Then both the mobile station transmitter/channel controller 505 and the base station 510 will decode the request and provide the decoded request to an algorithm for assigning I/Q subchannels 515 and 520 (step (3)). As discussed above, the algorithm for assigning I/Q subchannels 515 and 520 may decide on where to place the requested channel through the use of a lookup table that lists the proper placement of a newly requested channel depending upon which channels have already been allocated.

Once the channel is allocated, information regarding the channel allocation is provided back to the mobile station transmitter/channel controller 505 and the base station 510 (step (4)). With the reception of the information related to the allocated channel, the mobile station may commence use of the new call or new channel (step (5)).

Figure 6:
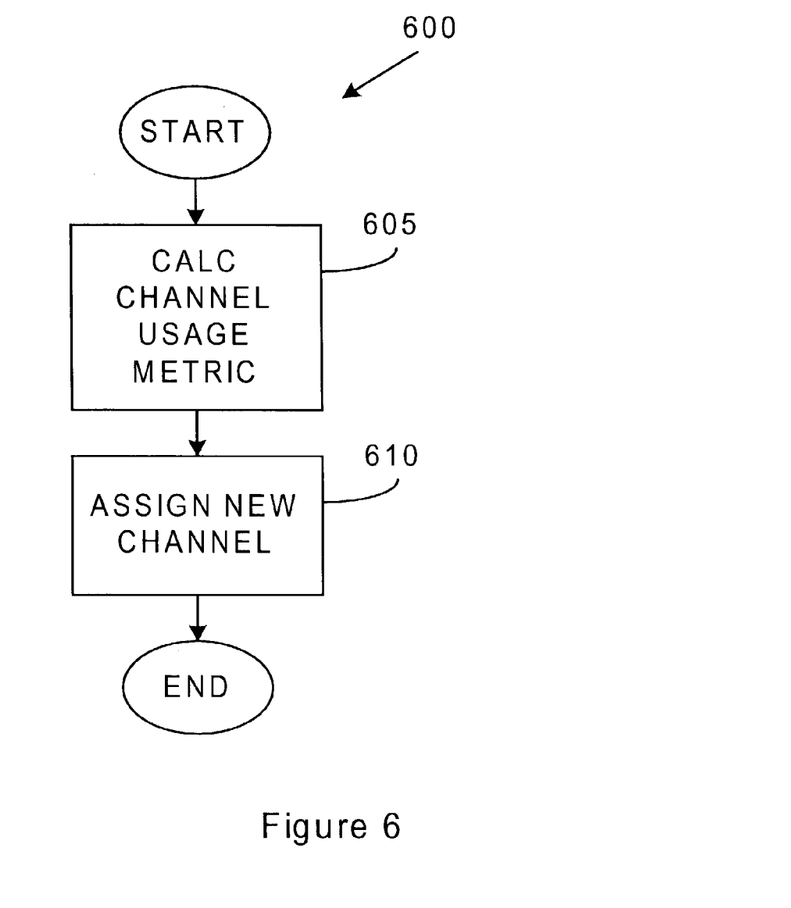
FIG. 6 is a diagram of a table displaying the effects of channel allocation on subchannel peak-to-average ratio in a CDMA2000 wireless communications system.

With reference now to FIG. 6, there is shown a diagram illustrating an algorithm 600 for use in allocating channels to subchannels, wherein a channel metric is used to determine the assignment of the channel, according to a preferred embodiment of the present invention. The algorithm 600 may be executed after a channel controller receives a request to allocate a new call or a new connection. Rather than looking up an allocation in a lookup table based on the channels that are active, such as described in FIG. 4, the channel controller may calculate a channel metric (block 605) which it will use to determine a channel assignment (block 610).

A channel metric may be a quantitative measurement of the subchannels, such as bandwidth utilization of the subchannels, the number of channels already assigned to the subchannels, the number of Walsh codes remaining for use in each subchannel, and so forth. Note that some of the metrics may be calculated instantaneously, while some may need to be measured over a period of time.

Based on one or more of the channel metrics, the channel controller makes a channel assignment (or it may choose to reassign some or all of the channels) (block 610). For example, if a bandwidth utilization measurement shows that one subchannel is carrying more data than the other, then the channel controller may wish to assign the new call or new channel onto the subchannel with the lower channel utilization. Alternatively, a simple count of available Walsh codes may tell the channel controller to assign the new call or new channel to the subchannel with more available Walsh codes. If the metric shows that the subchannels are essentially equal, then the channel controller may select the subchannel assignment at random or it may use a priority based scheme that can be based on a number of factors, including the channel that it is attempting to allocate.

Figure 7:
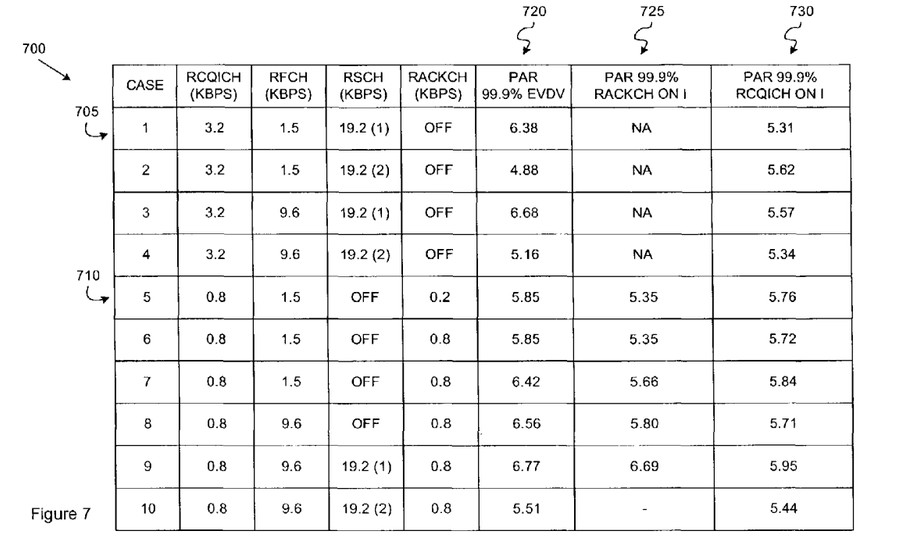
FIG. 7 is a diagram of a portion of a digital wireless communications device with built-in support for adaptive channel assignment, according to a preferred embodiment of the present invention.

With reference now to FIG. 7, there is shown a table 700 illustrating a peak-to-average ratio (PAR) on the I subchannel with various subchannel assignments, according to a preferred embodiment of the present invention. The table 700 illustrates several different examples of the effects of moving a single channel on the PAR on the I subchannel. For example, examining exemplary case #1 (displayed in a row denoted 705), there are three channels assigned: channels RCQICH, RFCH, and RSCH on the Q subchannel. Note that each subchannel is carrying data at a particular data rate indicated in the table. Then, a column (denoted 720) displays a 99.9% PAR (in dB) for the mobile station. A 99.9% PAR value indicates a value, in dB, in which 99.9 percent of the PAR values lie within. For example, a 99.9% PAR value of 5.16 dB means that 99.9 percent of the signals have a PAR of 5.16 dB or less.

For exemplary case #1, as assigned, the mobile station has a 6.38 dB 99.9% PAR value. However, if the RCQICH were moved to the I subchannel, then the 99.9% PAR (displayed in column denoted 730) would drop down to 5.31 dB, a significant drop of more than one dB. In exemplary case #5 (row denoted 710), moving RCQICH to the I subchannel changed the 99.9% PAR value from 5.85 dB to 5.76 dB. This relatively low drop in PAR value may be explained by a relatively low data rate on the RCQICH channel of 0.8 kbps.

Figure 8:
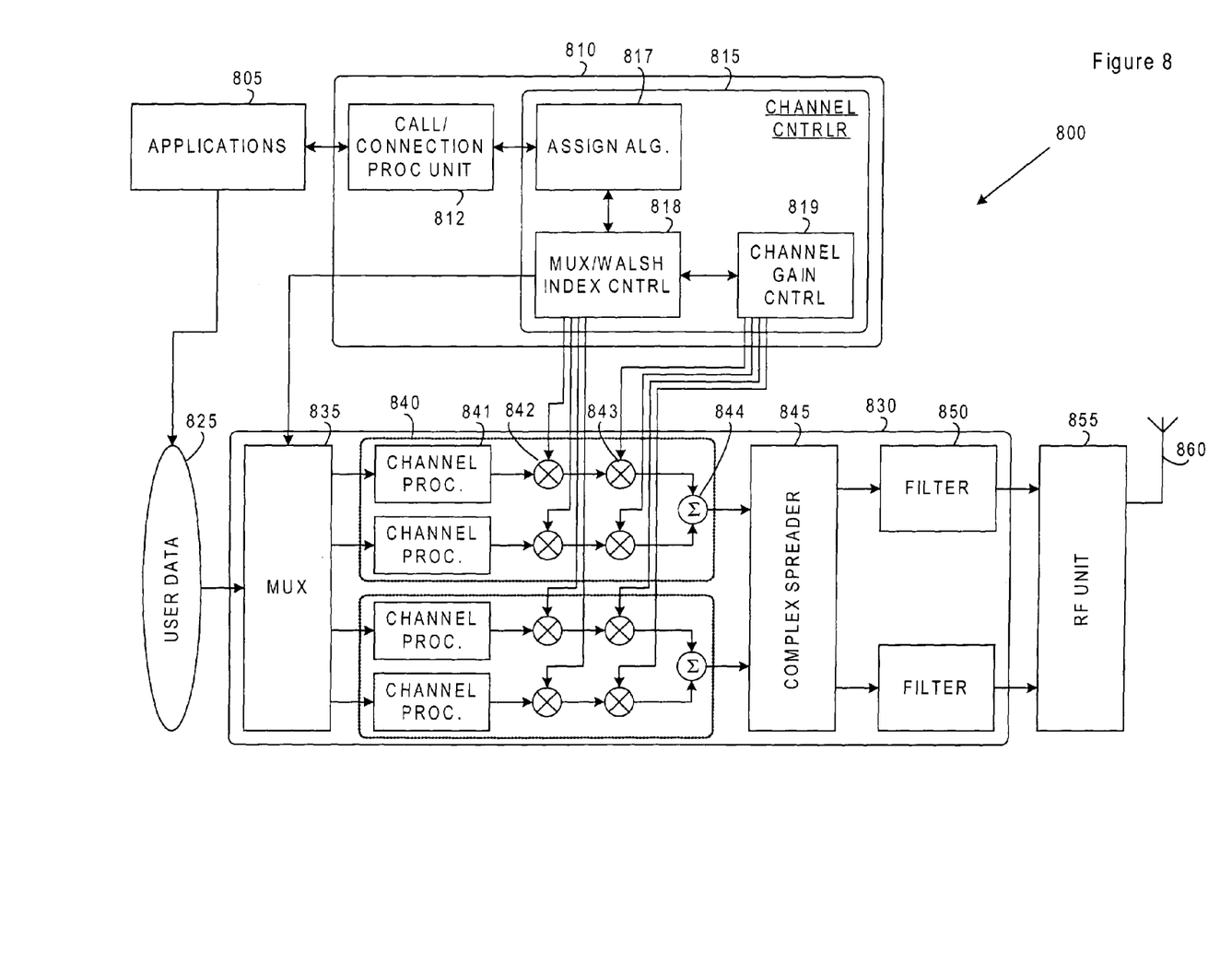
FIG. 8 is a block diagram of the architecture of a portion of a digital wireless communications device.

With reference now to FIG. 8, there is shown a block diagram of the architecture of a portion of a digital wireless communications device 800 with built-in support for adaptive channel assignment, according to a preferred embodiment of the present invention. The portion of the digital wireless communications device 800 displayed in FIG. 8 may be part of a wireless communications device, such as a cellular telephone, a wireless network access card for a computer or personal digital assistant, a pager, a music or video or multimedia device, and so forth. The digital wireless communications device 800 may be collectively referred to as a mobile station. Note that the portion of the digital wireless communications device 800 may, with relatively minor modifications, be a part of a base station for a digital wireless communications network.

The digital wireless communications device 800 may include other vital components that are not shown, such as a digital signal processing unit, a digital baseband unit, a display, a tactile interface (keypad, cursor control, and so on), an audio interface, a data interface, and so forth, which will make the digital wireless communications device 800 useful to users. What are shown in FIG. 8 are units used in digital wireless communications, such as: an applications unit 805, a channel control unit 810, an encoding unit 830, a radio (RF) unit 855, and an antenna 860. Note that the applications unit 805, channel control unit 810, and encoding unit 830 may be implemented as functions in a software application executing on a processor (not shown) or a digital signal processor (DSP) (also not shown).

The applications unit 805 may be a portion of the digital wireless communication device 800 wherein applications, such as software and firmware programs, are executed. These applications may provide the desired functionality for the digital wireless communications device 800. The applications executing in the applications unit 800 may be high level applications such as web browsers, email applications, music players, and so forth. Low level applications such as network interfaces, protocol managers, and so on may also execute in the applications unit 800.

The applications unit 805 is coupled to the channel control unit 810. The channel control unit 810 may be responsible for receiving requests for new calls and new channels from the applications unit 805 and can be used to perform allocations of the new calls and new channels onto appropriate subchannels. The channel control unit 810 may include a call/connection processing unit 812 and a channel controller 815. The call/connection processing unit 812 interfaces with the applications unit 805 and along with other functionality, manages active channels to and from the applications unit 805. For example, when an application executing in the applications unit 805 needs a new call or new connection, it may transmit a request for a new call or a new connection to the call/connection processing unit 812. The call/connection processing unit 812 can then interface with the channel controller 815 to obtain an actual call/channel assignment. The call/connection processing unit 812 may then return information about the assigned call/channel to the application in the applications unit 805.

The channel controller 815 may include an assignment algorithm unit 817, a multiplexor/Walsh code index controller 818, and a channel gain controller 819. The assignment algorithm unit 817 receives the request for the new call or new connection from the call/connection processing unit 812 and may use a lookup table or calculate a channel metric to help it determine an assignment for the call/connection. Discussion of the operation of the assignment algorithm unit 817 in greater detail may be found above. Once an assignment is made for the call/connection (and perhaps a complete reassignment of other active calls/channels), the assignment algorithm unit 817 provides information regarding the assignment to the multiplexor/Walsh code index controller 818. The multiplexor/Walsh code index controller 818 is used to provide correct multiplexor switch settings and Walsh code indexes to the encoding unit 830, among other things. Finally, should the call/channel need gain control, the channel gain controller 819 provides gain information to the encoding unit 830 to help ensure that the data on the channel meets desired signal levels.

Data that is to be transmitted (shown as a user data block 825) is provided to the encoding unit 830, where it directed to a proper (assigned) channel and subchannel (dependant on its channel assignment) by a multiplexor 835. The placement of the user data into the assigned channel and subchannel may be performed by a channel processing section (for example, channel processing section 840) which may include a channel processing unit 841, a pair of multiplier units 842 and 843 (which multiplies the user data with the assigned Walsh code and any signal gain), and the channels assigned to a single subchannel is then combined by an adder 844. Examples of the channel processing that may take place in the channel processing unit 841 may include: cyclic redundancy check encoding, code block repetition and/or puncturing, interleaving, scrambling, and modulating/mapping. After channel processing, the user data is then sent to a complex spreader unit 845 wherein the user data may be spread through the use of a specified spreading code. After spreading, the user data may undergo filtering (via a filter 850) to ensure that the transmitted signal will meet spectral requirements. Finally, the user data is provided to the RF unit 855 which may perform additional processing, especially in the analog domain, on the user data prior to transmission via the antenna 860.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for channel allocation on a link comprising:
   receiving a request for a logical channel;
   allocating the logical channel to an I or Q subchannel of a plurality of subchannels based on the request;
   providing a spreading code for the logical channel;
   sending information about the logical channel allocation on the link; and
   initiating the logical channel on the one subchannel;
   wherein a set of active logical channels comprises allocated logical channels on the link, and wherein the allocating is based on the set of active logical channels.

2. The method of claim 1, wherein the logical channel is allocated to the I subchannel.

3. The method of claim 1, wherein the logical channel is allocated to the Q subchannel.

4. The method of claim 1, wherein the channel allocation is for a wireless communications network, wherein a reverse link is a link from a mobile station to a base station, and wherein the plurality of subchannels are on the reverse link.

5. The method of claim 4, wherein the reverse link comprises two subchannels.

6. The method of claim 4, wherein the wireless communications network is a Code-Division Multiple Access (CDMA) wireless network.

7. The method of claim 6, wherein the wireless communications network is a CDMA2000 wireless network.

8. The method of claim 6, wherein the wireless communications network is a Universal Mobile Telecommunications System (UMTS) wireless network.

9. The method of claim 1, wherein the logical channel allocation is determined by a lookup table.

10. The method of claim 9, wherein the lookup table is indexed by the set of active logical channels.

11. The method of claim 9, wherein the lookup table is indexed by the set of active logical channels and the logical channel in the request.

12. The method of claim 1, wherein the logical channel allocation is determined by a state of a single subchannel in the link.

13. The method of claim 1, wherein the logical channel allocation is determined by a subchannel metric.

14. The method of claim 13, wherein the subchannel metric is subchannel data rate utilization.

15. The method of claim 13, wherein the subchannel metric is a number of available spreading codes.

16. The method of claim 13, wherein the subchannel metric is a number of logical channels already allocated.

17. The method of claim 1 further comprising conveying the request to a base station after the receiving.

18. The method of claim 17, wherein the sending comprises sending the information to both a source and a destination of the logical channel, and wherein the allocating and the sending occur in the base station.

19. The method of claim 1, wherein the sending comprises sending the information to both a source and a destination of the logical channel, and wherein the receiving, the allocating, and the sending occur in a mobile station.

20. The method of claim 1, wherein the sending occurs via a control message.

21. The method of claim 1, wherein another logical channel on the link is dedicated to a specific subchannel of the plurality of subchannels.

22. The method of claim 1, further comprising allocating multiple logical channels on the link to specific subchannels of the plurality of subchannels.

23. The method of claim 1, wherein the receiving occurs at a source of the logical channel, and the method further comprising forwarding the request to a destination of the logical channel after receiving the request.

24. The method of claim 23, wherein the allocating is performed at both the source and the destination of the logical channel.

25. The method of claim 24, wherein the allocating is done using a lookup table.

26. The method of claim 24, wherein the allocating is done based on the state of a communications channel.

27. The method of claim 23, wherein the initiating occurs at the source of the logical channel.

28. A channel control unit comprising:
   a call/connection unit containing circuitry to process call/connection requests and to maintain active calls/connections; and
   a channel controller coupled to the call/connection unit, the channel controller containing circuitry to allocate calls/connections based on call/connection requests provided by the call/connection unit and to assign spread codes, wherein the channel controller comprises
      an assignment unit containing circuitry to assign calls/connections to specific subchannels, and
      a spread code controller coupled to the assignment unit, the spread code controller containing circuitry to provide a spreading code to a multiplier used to spread data that is to be transmitted on the assigned call/connection.

29. The channel control unit of claim 28, wherein the channel controller further comprises a channel gain controller coupled to the spread code controller, the channel gain controller containing circuitry to provide gain compensation for data that is to be transmitted on the assigned call/connection.

30. The channel control unit of claim 28, wherein the channel controller can readjust the allocation of previously allocated calls/connections.

31. The channel control unit of claim 28, wherein the channel controller uses a lookup table to allocate the call/connection in the call/connection request.

32. The channel control unit of claim 28, wherein the channel controller uses channel metrics to allocate the call/connection in the call/connection request.

33. A wireless communications device comprising:
   an applications unit containing circuitry to support the execution of application programs;
   a channel control unit coupled to the applications unit, the channel control unit comprising
      a call/connection unit containing circuitry to process call/connection requests and to maintain active calls/connections, and
      a channel controller coupled to the call/connection unit, the channel controller containing circuitry to allocate calls/connections based on call/connection requests provided by the call/connection unit and assign spread codes; and
   an encoding unit coupled to the channel control unit, the encoding unit containing circuitry to spread, gain control, sum, and filter user data to be transmitted on allocated calls/connections.

34. The wireless communications device of claim 33, wherein the channel controller comprises:
   an assignment unit containing circuitry to assign calls/connections to specific subchannels; and
   a spread code controller coupled to the assignment unit, the spread code controller containing circuitry to provide a spreading code to a multiplier used to spread data that is to be transmitted on the assigned call/connection.

35. The wireless communications device of claim 33, wherein the wireless communications device is a base station in a wireless communications network.

36. The wireless communications device of claim 33, wherein the wireless communications device is a mobile station in a wireless communications network.

37. The wireless communications device of claim 33, wherein the wireless communications device operates in a Code-Division Multiple Access (CDMA) wireless network.

38. The wireless communications device of claim 37, wherein the wireless communications device operates in a CDMA2000 wireless network.

39. The wireless communications device of claim 37, wherein the wireless communications device operates in a Universal Mobile Telecommunications System (UMTS) wireless network.

* * * * *